United States Patent [19]

Sakamoto et al.

[11] Patent Number: 4,723,792
[45] Date of Patent: Feb. 9, 1988

[54] KNEE PROTECTOR ASSEMBLY IN A VEHICLE

[75] Inventors: Toshinori Sakamoto, Higashihiroshima; Isao Hirashima, Hiroshima, both of Japan

[73] Assignee: Mazda Motor Corporation, Hiroshima, Japan

[21] Appl. No.: 807,468

[22] Filed: Dec. 10, 1985

[30] Foreign Application Priority Data

Dec. 21, 1984 [JP] Japan .......................... 59-194752[U]

[51] Int. Cl.$^4$ ............................................ B60R 21/04
[52] U.S. Cl. .................................................. 280/751
[58] Field of Search ......................... 280/748, 751, 752

[56] References Cited

U.S. PATENT DOCUMENTS

| 3,341,249 | 9/1967 | Barenyi et al. | 296/70 |
|---|---|---|---|
| 3,719,245 | 3/1973 | Wilfert | 180/90 |
| 3,774,713 | 11/1973 | Stegmaier | 180/90 |
| 3,856,103 | 12/1974 | Scholz et al. | 180/90 |
| 3,938,821 | 2/1976 | Haas et al. | 180/90 |
| 3,984,128 | 10/1976 | Oehm et al. | 280/751 |
| 4,027,906 | 6/1977 | Matsuoka et al. | 280/751 |
| 4,032,175 | 6/1977 | Aibe et al. | 280/751 |
| 4,105,223 | 8/1978 | Oda et al. | 280/752 |
| 4,291,899 | 9/1981 | Muramoto | 280/751 |
| 4,317,582 | 3/1982 | Cottin et al. | 280/751 |
| 4,349,214 | 9/1982 | Inasawa et al. | 280/752 |
| 4,400,011 | 8/1983 | Matsuno | 280/751 |
| 4,421,343 | 12/1983 | Yoshitsugu et al. | 280/752 |
| 4,474,391 | 10/1984 | Matsuno et al. | 280/752 |
| 4,518,172 | 5/1985 | Bortz et al. | 280/751 |

FOREIGN PATENT DOCUMENTS 55-135651  3/1979  Japan .
59-23454   2/1984  Japan .

Primary Examiner—John J. Love
Assistant Examiner—Ross Weaver
Attorney, Agent, or Firm—Burns, Doane, Swecker & Mathis

[57] ABSTRACT

A knee protector assembly in a vehicle which comprises an elongated knee protector rigidly secured at its opposite ends to opposite fixed portions of a vehicle body structure so as to extend across the width of the vehicle body structure, a support bracket rigidly mounted on a portion of a floor panel of the vehicle body structure at a position intermediate of the width of the vehicle body structure, and a generally elongated connecting member having its opposite ends rigidly connected respectively to the support bracket and a cowl body of the vehicle body structure. The connecting member is capable of being plastically deformed when loaded with a predetermined load.

19 Claims, 4 Drawing Figures

KNEE PROTECTOR ASSEMBLY IN A VEHICLE

BACKGROUND OF THE INVENTION

The present invention generally relates to a safety device for protecting one or more automobile passengers and, more particularly, to a knee protector assembly for protecting passengers' knees against injury in the event of an automobile collision.

The knee protector assembly in an automobile is not a new development in the art and is disclosed in numerous patent publications. For example, Japanese Laid-open Utility Model Publication No. 55-135651, laid open to public inspection in 1980, discloses a knee protector assembly comprising a single elongated knee protector having its opposite ends rigidly secured to opposite fixed portions of an automobile body structure so as to extend across the width of the automobile body structure generally beneath an instrument panel and frontwardly of the obviously bucket-type front seats. An intermediate portion of the knee protector is rigidly connected to a console box which is in turn rigidly mounted atop the tunnel of a floor panel through which a propeller shaft extends. This Japanese publication describes that, in the event of a collision, the energy induced upon the knees of, for example, a driver striking against the knee protector is in part taken up by the console box.

According to the above mentioned Japanese publication, the extent to which the impact energy can be absorbed by the knee protector depends on the physical strength with which it is physically connected with the console box. Therefore, the prior art knee protector assembly has a problem in that a technical difficulty is involved in the determination of a tolerable range of the physical strength exhibited by the connection between the knee protector and the console box.

The use of separate knee protectors arranged in line with each other so as to extend across the width of an automobile body structure is disclosed in, for example, U.S. Pat. No. 4,291,899 patented Sept. 29, 1981. According to this U.S. patent, the knee protectors are rigidly connected at one end to opposite hinge pillars of the automobile body structure and at the other end to opposite side walls of the tunnel integral with the floor panel.

SUMMARY OF THE INVENTION

The present invention has for its object to provide an improved knee protector assembly wherein a plastically deformable member is employed to absorb impact energy in a controlled manner.

In order to accomplish this object, the present invention makes use of a support bracket means rigidly mounted on a portion of the floor panel, and a generally elongated, plastically deformable connecting frame member having its opposite ends rigidly connected to the support bracket means and a cowl body of the automobile body structure. In one preferred embodiment of the present invention, a single knee protector of a length corresponding to the width of the automobile body structure is utilized and is connected at its intermediate portion to the connecting frame member. However, in another preferred embodiment of the present invention, two separate knee protectors are employed and are rigidly connected at one end to opposite portions of the automobile body structure and at the other end to the support bracket means.

In both of these preferred embodiments of the present invention, the impact energy acting on the knee protector or protectors can be absorbed by the controlled plastic deformation of the connecting frame member. Moreover, the tendency of the cowl body to collapse rearwardly in the event of an automobile collision can be resisted by the connecting frame member, and, accordingly, the possibility of detachment of, and/or damage to, the front windshield supported by the cowl body can be advantageously minimized.

BRIEF DESCRIPTION OF THE DRAWINGS

This and other objects and features of the present invention will become readily understood from the following description taken in conjunction with preferred embodiments therefore with reference to the accompanying drawings, in which.

DETAILED DESCRIPTION OF THE EMBODIMENTS

Figure 1:
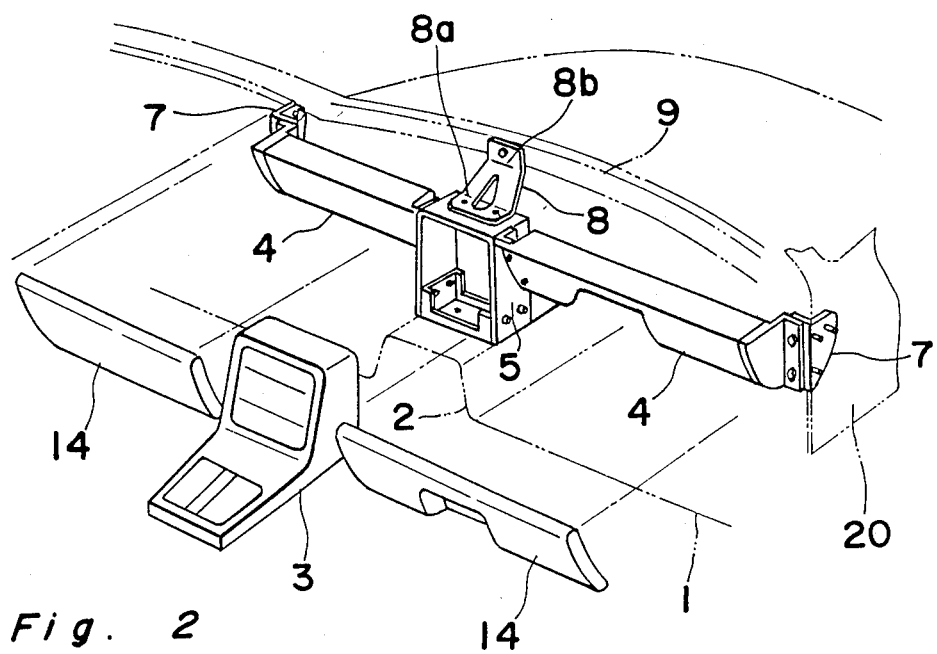
FIG. 1 is a fragmentary exploded view showing a knee protector assembly of the present invention with lower instrument panels and a console box separated.

Before the description of the present invention proceeds, it is to be noted that like parts are designated by like reference numerals throughout the accompanying drawings.

Figure 2:
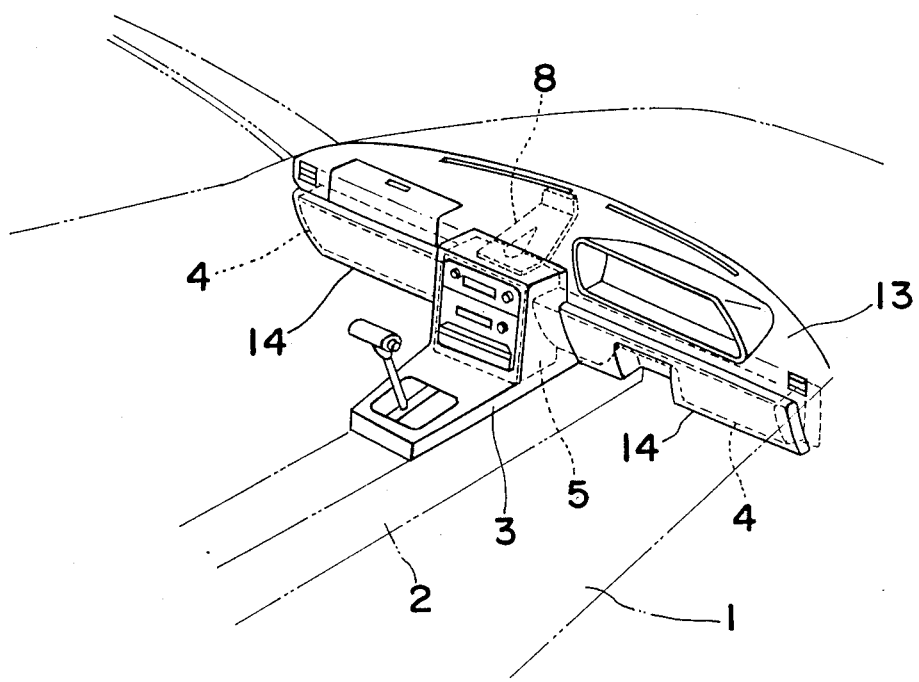
FIG. 2 is a fragmentary perspective view showing an automobile instrument panel with the knee protector assembly supported beneath the instrument panel.
Figure 3:
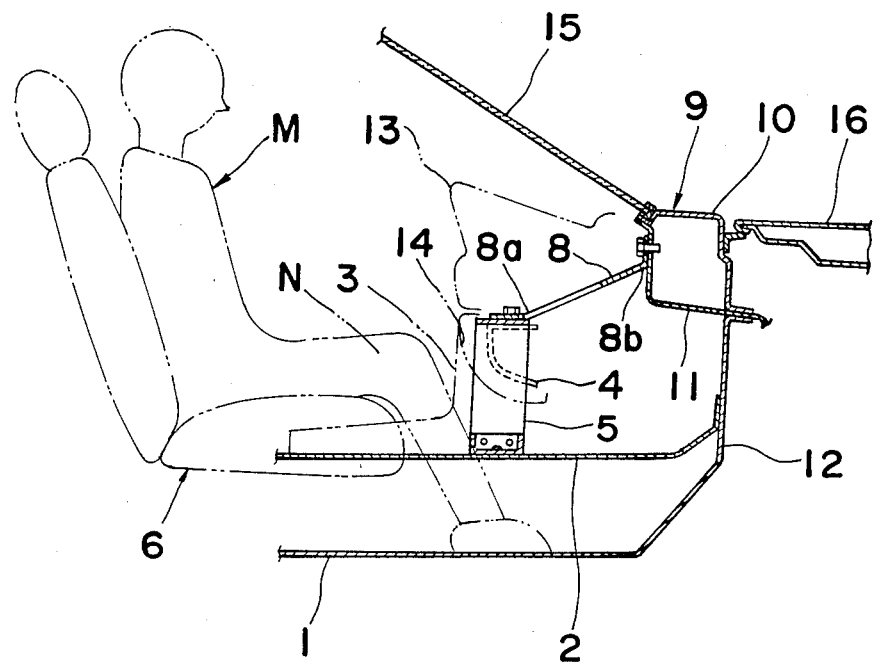
FIG. 3 is a schematic side sectional view of the knee protector assembly shown in relation to a vehicle seat occupant.

Referring to FIGS. 1 to 3, a knee protector assembly according to the present invention is shown as comprising a pair of elongated knee protectors 4 of identical construction arranged in line with each other so as to extend across the width of an automobile body structure beneath an instrument panel and in front of bucket-type front seats, only one of which is shown by the phantom line as a driver's seat in FIG. 3. These knee protectors 4 are rigidly connected at one end to opposite portions of a cab side body 20 through respective brackets 7 and at the other end to a support bracket 5. The support bracket 5 so far shown is in the form of a generally rectangular frame structure having top and bottom walls and a pair of side walls and is rigidly mounted on the top of a tunnel 2 with the bottom wall bolted, or otherwise welded thereto. As is well known to those skilled in the art, the tunnel 2 is generally integral with an automobile floor panel 1 and extends lengthwise of the automobile body structure located intermediately of the width of the automobile body structure for accommodating a propeller shaft therebelow. It is the side walls of the support bracket 5 to which the respective ends of the knee protectors 4 remote from the opposite portion of the cab side body 20 are bolted or otherwise welded.

The automobile body structure includes a cowl body 9 with which the support bracket 5 is connected through a yieldable connecting frame member which is deformable when loaded with a predetermined load. More specifically, the cowl body 9 is constituted by a transverse cowl panel 10 and an upper dashboard panel 11 both extending widthwise of the automobile body structure and having their lengthwise edges joined together so as to render the cowl body 10 as a whole to represent a generally closed cross-sectional shape. The connecting frame member 8 has its opposite end portions bent at 8a and 8b to provide fitting lugs bolted, or otherwise welded, to the top wall of the support bracket 5 and the upper dashboard panel 11, respectively.

The cowl body 9 is positioned above the floor panel 1, connected therewith through a lower dashboard panel 12 separating the passengers' compartment from a front engine room which is, as is well known to those skilled in the art, covered by a hingedly supported bonnet 16. Reference numerals 13 and 14 represent upper and lower instrument panels, respectively, the lower instrument panels 14 being used to cover up the knee protectors 4 as best shown in FIG. 2 while the support bracket 5 is covered by a console box 3 fixedly mounted atop the tunnel 2. Reference numeral 145 represents a front windshield supported in any manner well known to those skilled in the art.

The knee protector assembly of the above described construction operates in the following manner.

In the event of, for example, an automobile collision, the driver M will be thrown forward with respect to the direction of run of the automobile, accompanied by the thrust of his knees N. When the knees N are so thrusted, they strike upon the associated knee protector 4 through the lower instrument panel 14. Depending on the magnitude of impact force with which the knees N have struck upon the associated knee protector 4, the connecting member 8 either undergoes a plastic deformation or remains retaining its original shape. More specifically, where the impact force is small, the impact energy can be absorbed by an energy absorbing system including the associated knee protector 4, the support bracket 5 and the connecting frame member 8 to lessen the transmission of the impact energy to the knees N. However, where it is great, the connecting frame member 8 is plastically deformed to quickly absorb the impact energy. In this way, the absorption of the impact energy can be controlled in two stages.

The plastic deformation of the connecting frame member 8 referred to above takes place along the bent lines 8a and 8b. However, other than the bent lines 8a and 8b, the connecting frame member 8 may be formed with a thin walled region, or one or more cutouts at and/or from which the plastic deformation can be initiated when the connecting frame member is loaded with a predetermined impact force.

At the time of automobile collision, a sudden impact also acts on the cowl body 9, which impact is, according to the present invention, resisted by the connecting frame member 8 with no substantial possibility of the cowl body being collapsed rearwardly. This is because the connecting frame member 8 is interposed between the cowl body 9 and the support bracket 5 as hereinbefore described and, therefore, acts as a reinforcement effective not only to resist against the rearward collapse of the cowl body 9, but also to prevent the front windshield 15 from being detached or broken which would otherwise take place when the cowl body is rearwardly collapsed.

Figure 4:
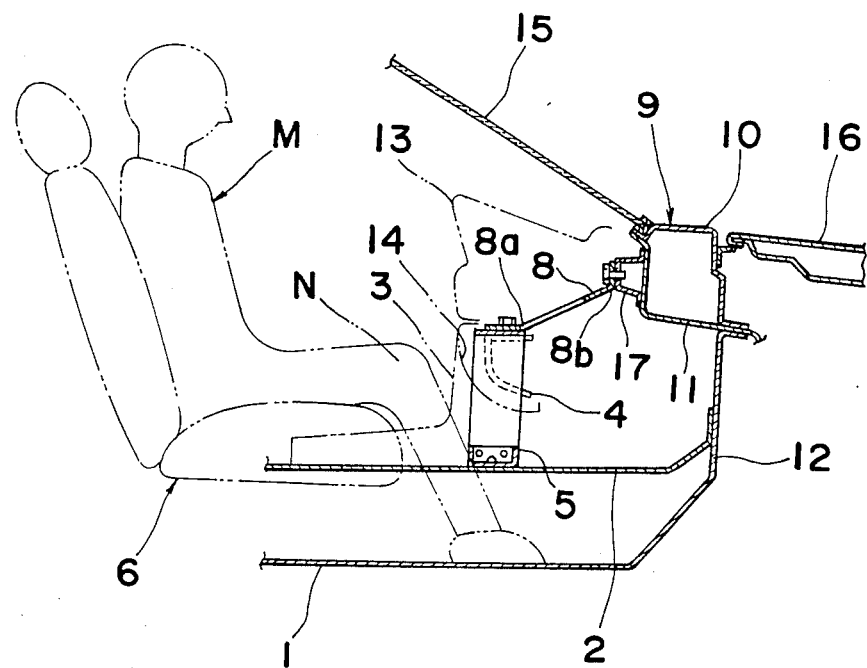
FIG. 4 is a view similar to FIG. 3, showing another embodiment of the present invention.

In the foregoing embodiment shown in and described with reference to FIGS. 1 to 3, the fitting lug of the connecting frame member 8 remote from the support bracket 5 has been shown and described as connected to the cowl body 9. However, in the embodiment shown in FIG. 4, the fitting lug of the connecting frame member 8 is bolted, or otherwise welded, to a generally U-sectioned frame 17 rigidly secured to the upper dashboard panel 11 forming a part of the cowl body 9. Not only does the frame 17 serve as a reinforcement, but the use of the frame 17 can make it easy to mount the upper instrument panel 13.

Although the present invention has been fully described in connection with the preferred embodiments thereof with reference to the accompanying drawings, it is to be noted that various changes and modifications are apparent to those skilled in the art. By way of example, although the knee protector assembly has been shown and described as comprised of two separate knee protectors connected together through the support bracket so as to extend across the width of the automobile body structure, it may comprise a single knee protector. Where the single knee protector is employed across the width of the automobile body structure, the single knee protector should have its intermediate portion rigidly connected to the connecting frame member which extends between the support bracket and the cowl body.

Such changes and modifications are to be understood as included within the scope of the present invention as defined by the appended claims.

What is claimed is:

1. A knee protector assembly in a vehicle having a passenger compartment which comprises an elongated knee protector extending widthwise of a vehicle body structure;

a support bracket means incluidng a pair of generally rectangular side walls and a generally rectangular top wall rigidly connected at opposite ends to the top ends of said side walls, each of said side and top walls having a dimension of width in the lengthwise direction of the vehicle body structure, said support bracket means being fixed to a tunnel portion of a floor panel of the vehicle body structure at a position intermediate of the width of the vehicle body structure, said knee protector being rigidly connected at one end to the support bracket means and at the other end to a fixed portion of a cab side body of the vehicle body structure, said vehicle body strucutre including a windshield and a cowl body, said cowl body having an upper dashboard panel on which the windshield is placed and which includes a rear surface facing the passenger compartment, said support bracket means being positioned on the passenger compartment side of said dashboard panel; and a generally elongated connecting member having opposite ends rigidly connected resepctively to the support bracket means and the rear surface of the upper dashboard panel to provide structural support between the floor panel of the vehicle body and the upper dashboard panel on which the windshield is placed to provide means for exerting a force opposing an inward movement of said upper dashboard panel, said connecting member capable of being plastically deformed when loaded with a predetermined load.

2. The assembly as claimed in claim 1, wherein the connecting member has at least one energy absorbing region defined therein.

3. The assembly as clained in claim 2, wherein the energy absorbing region is constituted by at least one line of bending along which the connecting member is bent.

4. The assembly as claimed in claim 2, wherein the energy absorbing region is constituted by a thin-walled area in the connecting member.

5. The assembly as claimed in claim 2, wherein the energy absorbing region is constituted by at least one cutout in the connecting member.

6. The assembly as claimed in claim 1, further comprising a frame member rigidily secured to the rear surface of the upper dashboard panel, and wherein one of the opposite ends of the connecting member remote from the support bracket means is rigidly connected with the cowl body through the frame member.

7. The assembly as claimed in claim 1, wherein said portion of the floor panel is a top of a tunnel through which a propeller shaft extends.

8. The assembly as claimed in claim 7, further comprising a console box mounted on the tunnel so as to cover up the support bracket means.

9. The assembly as claimed in claim 8, wherein the support bracket means is in the form of a generally rectangular frame structure.

10. A knee protector assembly in a vehicle having a passenger compartment which comprises first and second elongated knee protectors extending in line with each other across the width of a vehicle body structure;
   a support bracket means including a pair of generally rectangular side walls and a generally rectangular top wall rigidly connected at opposite ends to the top ends of said side walls, each of said side and top walls having a dimension of width in the lengthwise direction of the vehicle body structure, said support bracket means being rigidly fixed to a tunnel portion of a floor panel of the vehicle body structure at a position intermediate of the width of the vehicle body structure, said first and second knee protectors being rigidly connected at one end to the support bracket means, said vehicle body structure including a windshield and a cowl body, said cowl body having an upper dashboard panel on which the windshield is placed and which includes a rear surface facing the passenger compartment, said support bracket means being positioned on the passenger compartment side of said dashboard panel; and
   a generally elongated connecting member having its opposite ends rigidly connected respectively to the support bracket means and the rear surface of the upper dashboard panel to provide structural support between the floor panel of the vehicle body and the upper dashboard panel on which the windshield is placed to provide means for exerting a force opposing an inward movement of said upper dashboard panel, said connecting member capable of being plastically deformed when loaded with a predetermined load.

11. The assembly as claimed in claim 10, wherein the connecting member has at least one energy absorbing region defined therein.

12. The assembly as claimed in claim 11, wherein the energy absorbing region is constituted by at least one line of bending along which the connecting member is bent.

13. The assembly as claimed in claim 11, wherein the energy absorbing region is constituted by a thin-walled area in the connecting member.

14. The assembly as claimed in claim 11, wherein the energy absorbing region is constituted by at least one cutout in the connecting member.

15. The assembly as claimed in claim 10, further comprising a frame member rigidly secured to the rear surface of the upper dashboard panel, and wherein one of the opposite ends of the connecting member remote from the support bracket means is rigidly connected with the cowl body through the frame member.

16. The assembly as claimed in claim 10, wherein said portion of the floor panel is a top of a tunnel through which a propeller shaft extends.

17. The assembly as claimed in claim 16, further comprising a console box mounted on the tunnel so as to cover up the support bracket means.

18. The assembly as claimed in claim 17, wherein the support bracket means is in the form of a generally rectangular frame structure.

19. The assembly as claimed in claim 10, wherein the first and second knee protectors are rigidly connected at the other end to opposite portions of a cab side body of the vehicle body structure, respectively.

* * * * *